United States Patent
Shao et al.

(10) Patent No.: US 8,449,033 B2
(45) Date of Patent: May 28, 2013

(54) TRACK RELEASE MECHANISM

(75) Inventors: Yi Shao, Canton, MI (US);
Tamizharasan Shannugam, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 1048 days.

(21) Appl. No.: 11/721,144

(22) PCT Filed: Dec. 14, 2005

(86) PCT No.: PCT/US2005/045025
§ 371 (c)(1),
(2), (4) Date: Dec. 30, 2009

(87) PCT Pub. No.: WO2006/065796
PCT Pub. Date: Jun. 22, 2006

(65) Prior Publication Data
US 2010/0102610 A1   Apr. 29, 2010

Related U.S. Application Data

(60) Provisional application No. 60/636,313, filed on Dec. 15, 2004.

(51) Int. Cl.
*B60N 2/04* (2006.01)
(52) U.S. Cl.
USPC ............................. 297/341; 297/344.1
(58) Field of Classification Search
USPC ............................. 297/341, 344.1
See application file for complete search history.

(56) References Cited

U.S. PATENT DOCUMENTS

| | | | |
|---|---|---|---|
| 5,820,216 A * | 10/1998 | Feuillet | 297/341 |
| 5,855,413 A | 1/1999 | Couasnon et al. | |
| 6,616,233 B1 | 9/2003 | Debus et al. | |
| 6,926,364 B2 * | 8/2005 | Cooley et al. | 297/341 |
| 7,017,993 B2 * | 3/2006 | Niimi et al. | 297/341 |
| 7,097,250 B2 * | 8/2006 | Rausch et al. | 297/341 X |

OTHER PUBLICATIONS

International Search Report dated Feb. 21, 2007 as received in corresponding PCT Application No. PCT/US2005/045025, 2 pages.

* cited by examiner

*Primary Examiner* — Anthony D Barfield
(74) *Attorney, Agent, or Firm* — Foley & Lardner LLP

(57) ABSTRACT

A track release system for a vehicle seat includes a device for selectively engaging a track to prevent sliding movement of a vehicle seat, a cable coupled to the device, and a track release mechanism coupled to the cable for actuating the device. The track release mechanism includes a drive arm configured for movement between a first position and a second position. The drive arm is configured to cause the device to disengage the track when moved from the first position to the second position. The track release mechanism also includes a trigger arm configured for rotational movement and configured to cause the device to engage the track when the drive arm is in the second position. The trigger arm is configured to reset the track release system such that sliding movement of the vehicle seat is prevented when the drive arm is in the second position.

24 Claims, 10 Drawing Sheets

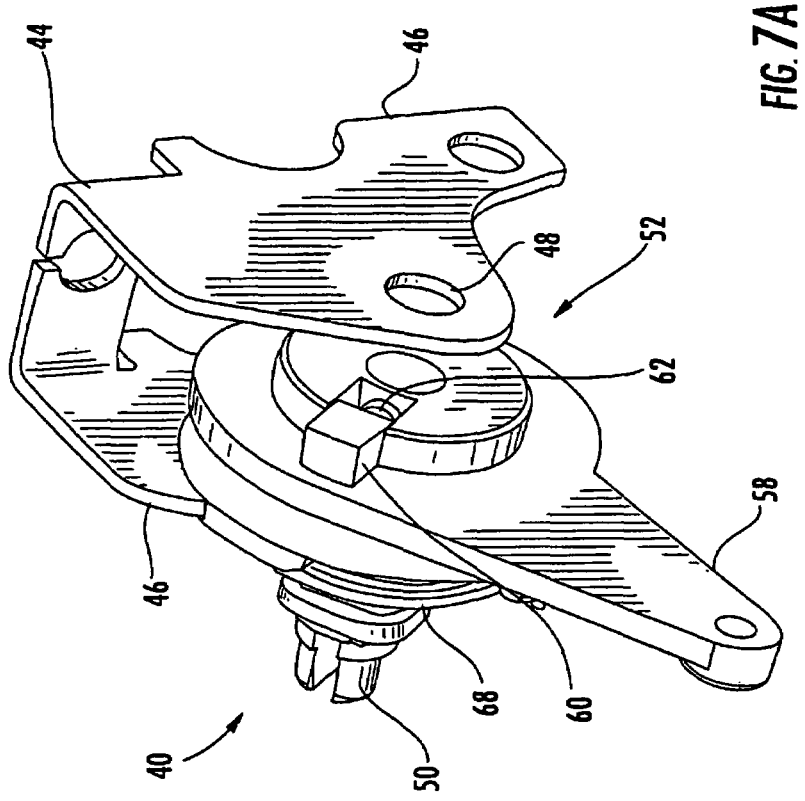
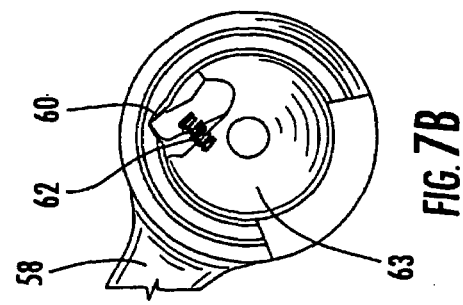

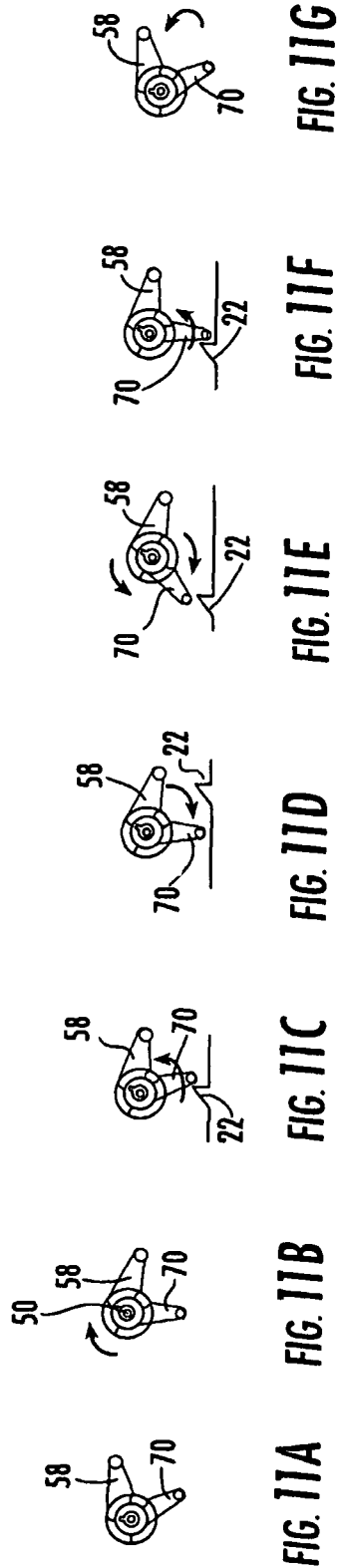
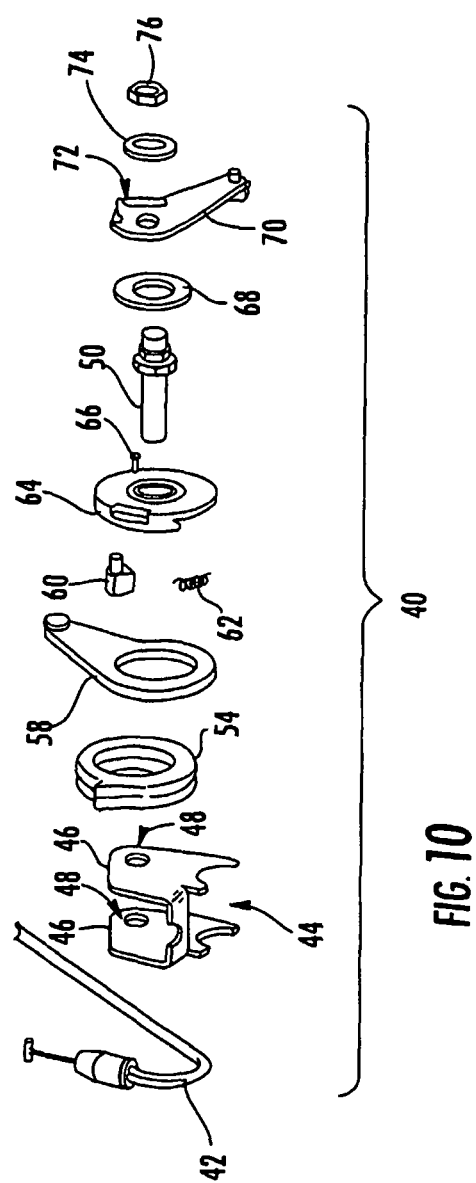

US 8,449,033 B2

TRACK RELEASE MECHANISM

CROSS-REFERENCE TO RELATED APPLICATIONS

The present application is a National Stage of International Application No. PCT/US2005/045025 filed on Dec. 14, 2005, which claims the benefit of U.S. Provisional Patent Application No. 60/636,313 filed on Dec. 15, 2004. The entire disclosures of International Application No. PCT/US2005/045025 and U.S. Provisional Patent Application No. 60/636,313 are incorporated herein by reference.

BACKGROUND

The present invention relates generally to the field of vehicle seats. More specifically, the present invention relates to a vehicle seat having a manual track release that automatically resets.

It is known to provide seats for vehicles (i.e., automobiles) that include seat backs that are able to be reclined by a user. Such seats may be configured for movement along a track in a fore and aft direction (e.g., forward towards the front of the vehicle and back towards the rear of the vehicle).

In certain applications, a vehicle seat back may be configured to fold downward toward the seat base. For example, a rear seat in a truck or van may be rotated toward the seat base to provide a larger cargo area in the rear of the vehicle. Where the seat is configured for movement along a track, rotation of the seat back toward the seat base may enable free movement of the seat along the track (i.e., the rotation of the seat back may disengage a locking mechanism that secures the seat in place along the track, which in turn allows the folded seat to move freely along the track). However, in order to lock the folded seat in place relative to the track (i.e., to prevent free movement along the track), the user must manually lock the seat in place using, for example, a latching mechanism or the like. One disadvantage of such an arrangement is that locking the seat in place is relatively cumbersome and generally requires two-handed operation (e.g., one hand to move the seat and another to engage the locking mechanism).

It would be advantageous to provide a vehicle seat that is configured for movement relative to a track in the folded position and which may be locked in place relatively easily and with less effort than is known with respect to conventional vehicle seats. It would also be advantageous to provide a track release mechanism for a vehicle seat that may be manually operated and that may manually reset itself to allow the user to relatively simply lock the seat in place along the track. It would be desirable to provide a vehicle seat that provides any one or more of these or other advantageous features as will be apparent from the following description.

SUMMARY

An exemplary embodiment of the invention relates to a track release system for a vehicle seat that includes a device for selectively engaging a track to prevent sliding movement of a vehicle seat, a cable coupled to the device, and a track release mechanism coupled to the cable for actuating the device. The track release mechanism includes a drive arm configured for movement between a first position and a second position. The drive arm is configured to cause the device to disengage the track when moved from the first position to the second position. The track release mechanism also includes a trigger arm configured for rotational movement and configured to cause the device to engage the track when the drive arm is in the second position. The trigger arm is configured to reset the track release system such that sliding movement of the vehicle seat is prevented when the drive arm is in the second position.

Another exemplary embodiment of the invention relates to a track release mechanism for a vehicle seat, with the vehicle seat coupled to a track system having a lower track secured to a vehicle and an upper track slidingly attached to the lower track. The track release mechanism includes a base comprising two substantially parallel arms, a center shaft extending between the arms of the base, a drive arm module provided on the center shaft between the arms of the base, and a cable coupled to the drive arm module and to a track latch device, the track latch device configured to prevent sliding movement of the vehicle seat by selectively engaging the lower track. The drive module includes (a) a drive arm configured to support a locking block and biasing member, with the drive arm positioned between a cable shell having a cable notch and an outer cable shell having a guide pin; (b) a reset spring provided on the center shaft and coupled to the cable shell; and (c) a trigger arm provided on the center shaft and defining a guide slot configured to receive the guide pin, with the trigger arm biased on the center shaft by a trigger spring. Folding the vehicle seat to a stowed position causes the track latch device to disengage the lower track to allow sliding movement of the vehicle seat. The trigger arm is configured to engage a tab provided on the lower track when the vehicle seat is moved along the track system in the stowed position to cause the latch device to engage the lower track and prevent movement of the vehicle seat along the track system.

BRIEF DESCRIPTION OF THE DRAWINGS

FIG. 7A is a perspective rear view of several components of a track release mechanism for a seat according to an exemplary embodiment.

FIG. 7B is a plan view a portion of a track release mechanism according to another exemplary embodiment that includes a locking block and its biasing member aligned at an angle other than 90° to the center shaft.

FIG. 10 is an exploded illustration of a track release mechanism for a seat according to an exemplary embodiment.

FIGS. 11A-11G are side plan views of a track release mechanism for a seat according to an exemplary embodiment illustrating the operation of the track release mechanism.

DETAILED DESCRIPTION

According to an exemplary embodiment, a vehicle seat is provided that includes a track release mechanism that is relatively simple to operate and that may be reset by movement of the seat along the vehicle track. The track release mechanism may be configured to engage or interact with a feature provided, for example, along the track that may operate to reset the track release mechanism such that the vehicle seat may be locked in place at a predetermined location along the track without the need to manually reset the track release mechanism.

Figure 1:
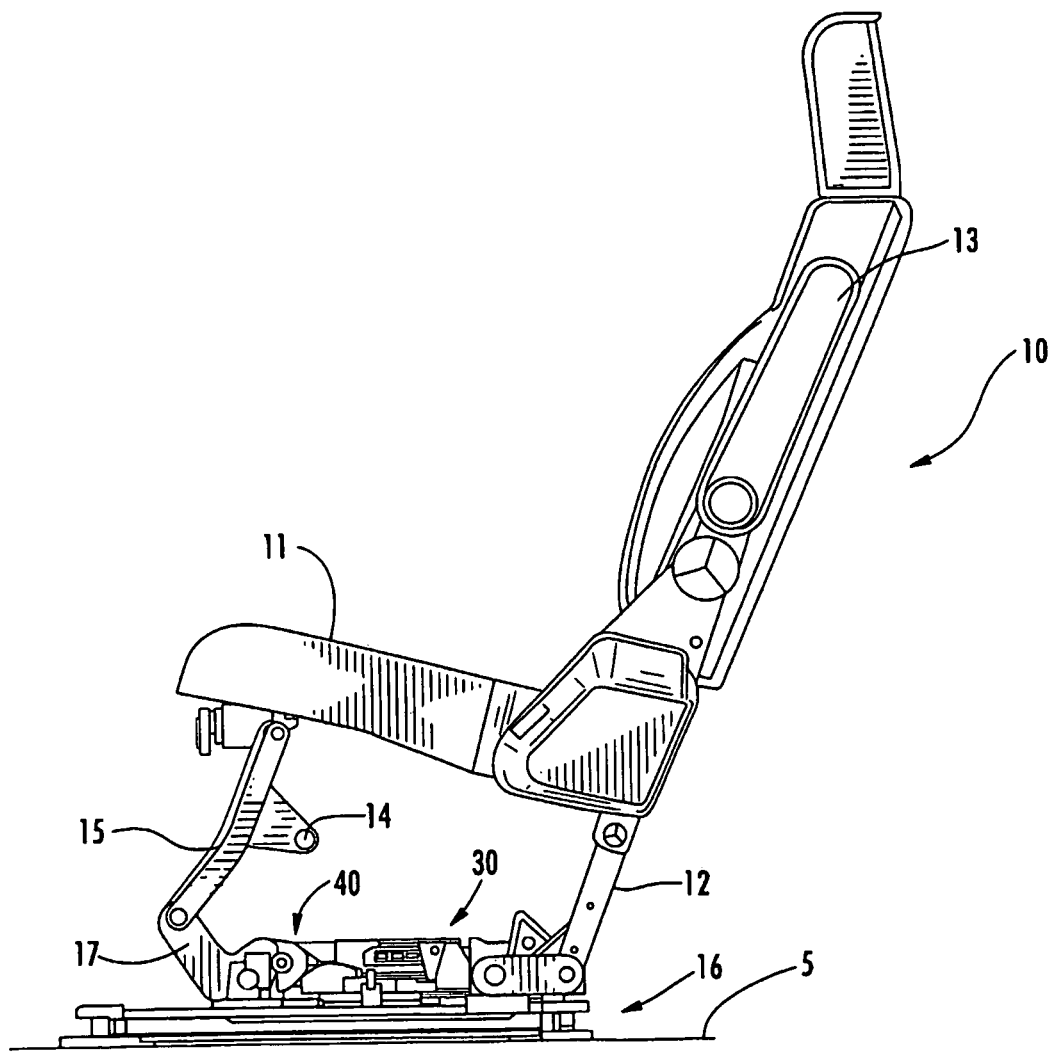
FIG. 1 is a side plan view of a seat including a track release mechanism mounted in a vehicle according to an exemplary embodiment.

FIG. 1 illustrates a vehicle seat 10 for use in a vehicle 5 and which includes a seat to cushion or base 11 and a seat back 13. It should be noted that while a particular configuration is illustrated for the seat 10, the various concepts described herein may be used in conjunction with seats having any of a variety of configurations, whether now known or that may be developed in the future.

According to an exemplary embodiment, the seat cushion 11 and seat back 13 are independently, pivotably connected to seat support members. As shown, for example, in FIG. 1, the seat cushion 11 is coupled to a rear seat support member 12 and a front seat support member 15 (which is in turn coupled to a second front seat support member 17), and the seat back 13 is coupled to the rear seat support member 12. Similar seat support members may be provided on both the left and right sides of the seat 10; for brevity, both seat support members on the right and left sides of the seat 10 will be referred to using identical reference numerals (e.g., a seat support member 12 may be provided at both the left and right rear of the seat 10).

The seat back is configured for rotation between an upright position (as shown in FIG. 1) and a stored or folded position in which the seat back 13 is rotated toward the seat cushion 11. The seat back 13, seat support members 12, 15, and 17, and support frames can be composed of any suitable material such as metal (steel for example) or an engineered plastic of suitable strength (composite materials for example).

The seat 10 can be either a manually adjustable seat or may be provided with electric motors to provide automated adjustment and electronic control of the seat 10. Such manipulation can be accomplished by the use of a change of position mechanism coupled to the seat back 13 and the seat cushion 11. It is also contemplated that two separate mechanisms may be used to provide flexibility in seat configuration. The change of position mechanism may provide for a back frame to move in proportional relation to the seat cushion 11 at a predetermined ratio.

Figure 2:
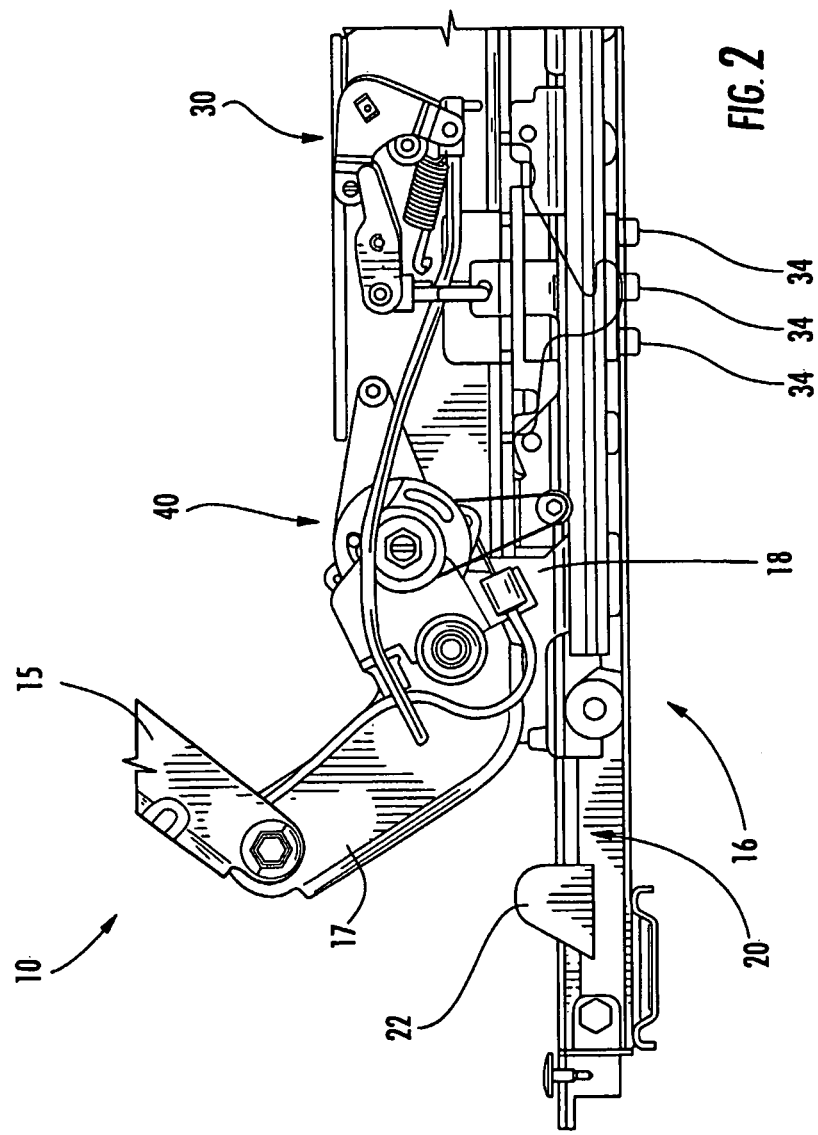
FIG. 2 is a partial side view of the seat illustrated in FIG. 1.

As shown in FIGS. 1 and 2, the seat 10 is coupled by way of the seat support members 12, 15, and 17 to a seat track system 16 that includes an upper track 18, a lower track 20 and a track latch 30. According to an exemplary embodiment, the upper track 18 may be configured for movement relative to the lower track 20, which may be secured to the vehicle 5 using fasteners such as screws, bolts, or the like. Because the seat support members 12 and 17 are coupled to the upper track 18, the seat 10 may be moved forward and backward in the vehicle 5 by moving the upper track 18 and attached vehicle seat 10 relative to the lower track 20, which is fixed within the vehicle.

A track release mechanism 40 is coupled to one of the seat support members. As shown in FIG. 2, according to an exemplary embodiment, the track release mechanism 40 is coupled to the seat support member 17. It should be understood, however, that the track release mechanism 40 can be mounted in any convenient location associated with the vehicle seat 10.

As shown in FIG. 2, a track latching mechanism or device 30 (e.g., a track latch) is coupled to the upper track 18, and includes an operating member 32 that includes a plurality of extensions or teeth 34 that are configured to engage apertures or holes (e.g., windows, openings, etc.) provided in the lower track 20. The track latch 30 may be operated to move the extensions 34 between a first position in which they engage the apertures in the lower track 20 (to lock the upper track 18 in place relative to the lower track 20) and a second position in which they do not engage the apertures in the lower track 20 (to allow the upper track 18 to move freely relative to the lower track 20). It should be noted that the configuration of the operating member 32 and extensions may differ according to other exemplary embodiments, and may include a greater or lesser number of extensions that illustrated in the accompanying FIGURES.

The track release mechanism 40 is coupled to the track latch 30 by a cable or wire 42 (the track release mechanism 40, track latch 30, and cable 42 may collectively be referred to as a track release system). Movement of the cable 42 may act to operate the track latch 30 to cause the operating member 32 to either engage or disengage the apertures provided in the lower track 20. In this manner, the track release mechanism 40 may be utilized to either lock the seat in position along the track system 16 or to unlock the seat 10 to allow it to move along the track system 16.

Figure 3:
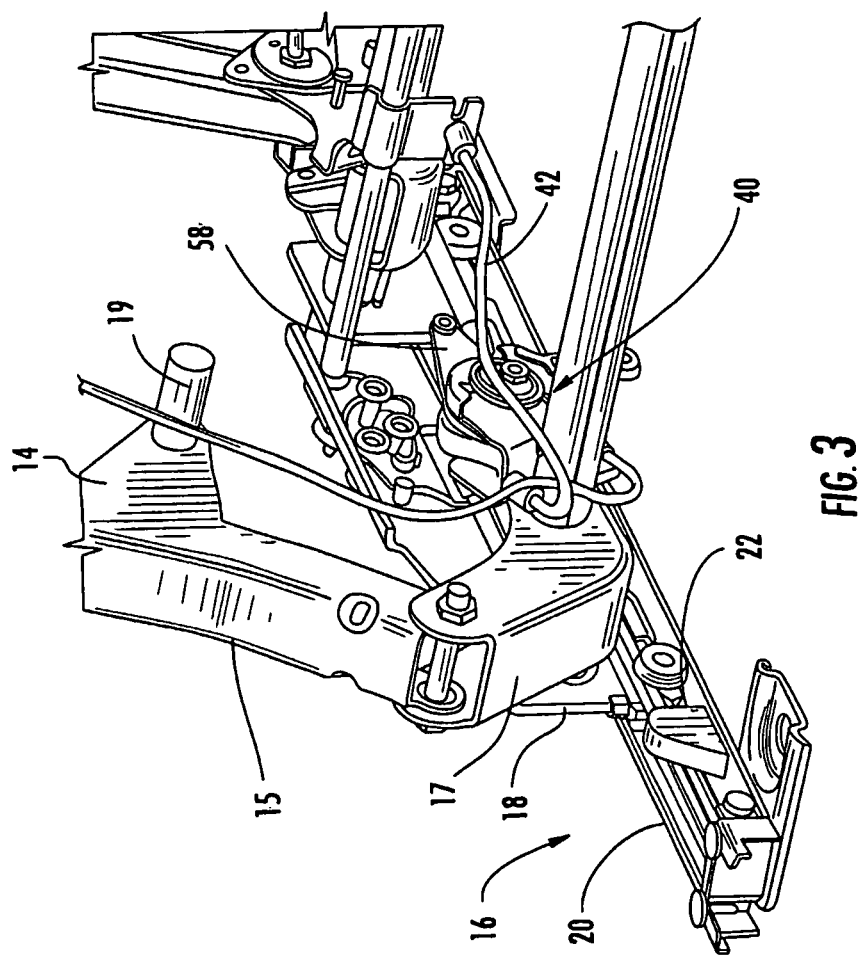
FIG. 3 is a partial perspective front view of the seat illustrated in FIG. 1.
Figure 4:
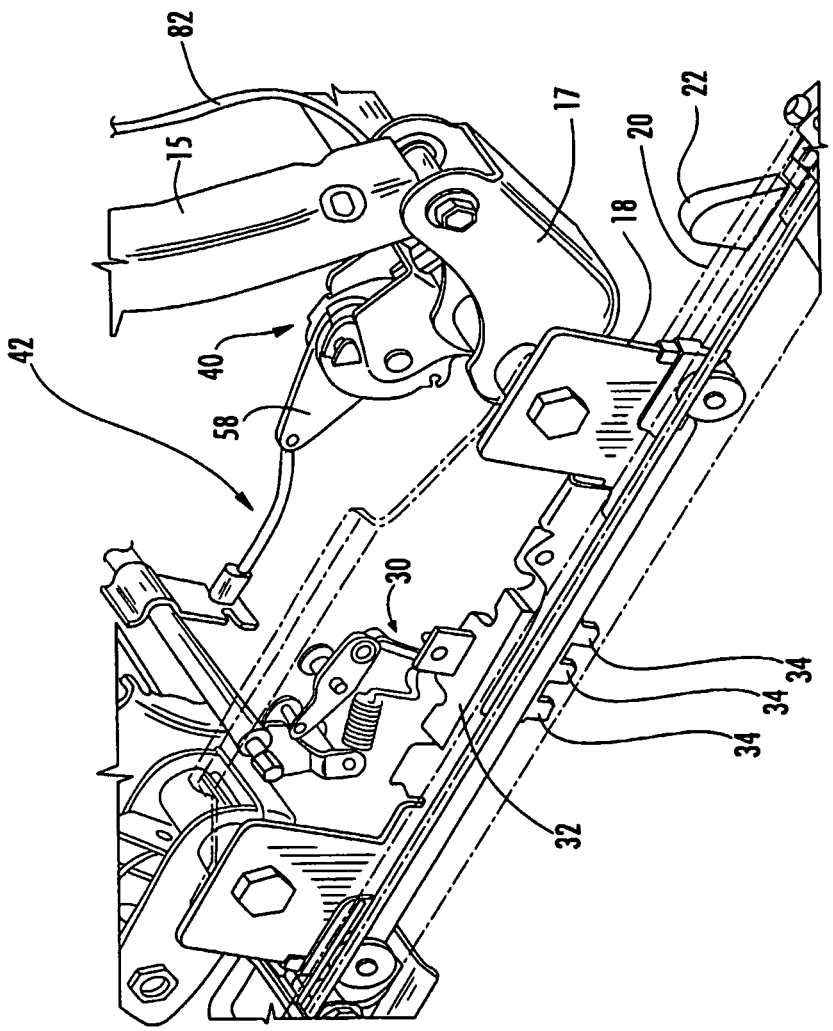
FIG. 4 is a partial perspective front view of the seat illustrated in FIG. 1.
Figure 5:
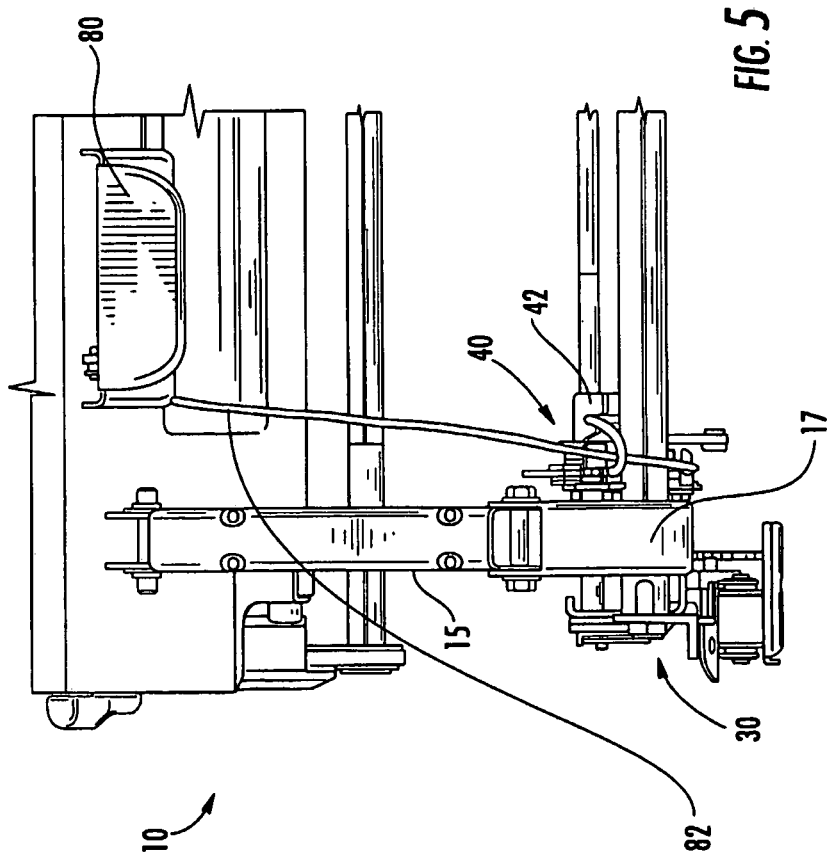
FIG. 5 is a partial front plan view of the seat illustrated in FIG. 1.
Figure 6:
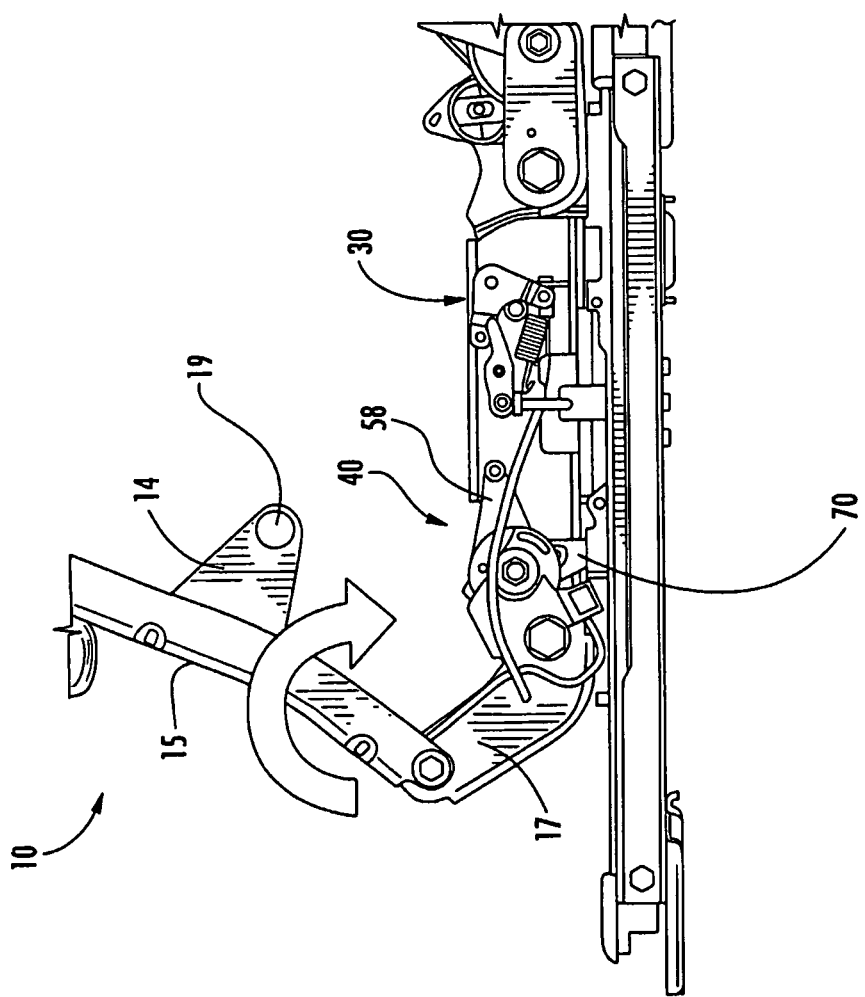
FIG. 6 is a partial side plan view of the seat illustrated in FIG. 1 and indicating one motion of the front seat support member.
Figure 8:
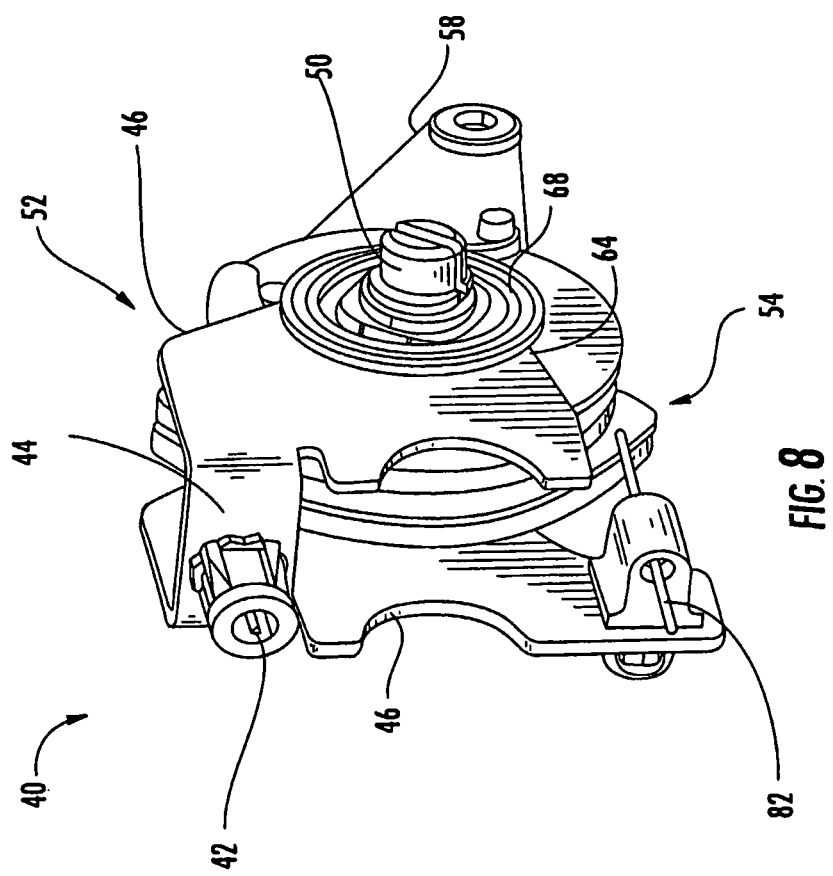
FIG. 8 is a perspective front view of several components of a track release mechanism for a seat according to an exemplary embodiment.
Figure 9:
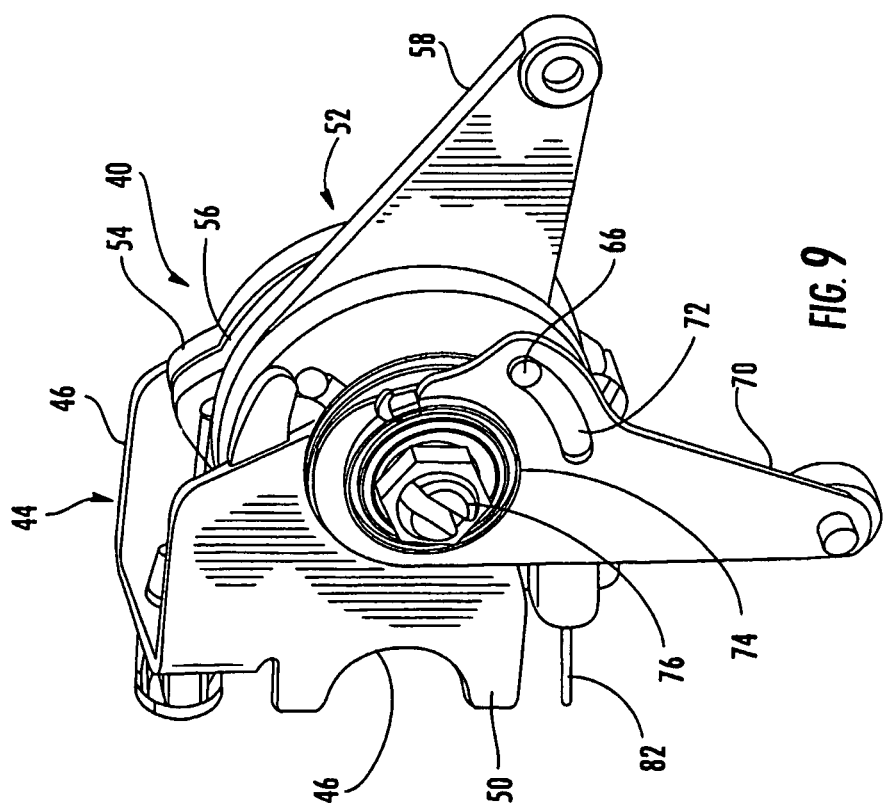
FIG. 9 is a perspective view of a track release mechanism for a seat according to an exemplary embodiment.

As illustrated in FIGS. 3 and 6, coupled to one of the seat support members of the vehicle seat 10 (e.g., seat support member 15) is an extension 14 having a rod or pin 19 extending therefrom at substantially a right angle. According to other exemplary embodiments, the pin may extend from the seat support member 15 or from another structure. The pin 19 is configured to contact a portion of the track release mechanism 40 (e.g., a drive arm 58 of the track release mechanism 40, as shown in FIG. 6) when the seat back 13 is folded to a stowed position. Rotation of the seat back 13 causes the seat support member 15 to rotate downward toward the track system 16 as shown in FIG. 6, at which time the pin 19 will contact the arm 58.

FIGS. 7-10 illustrate in greater detail the features of the track release mechanism 40, with FIG. 10 shown as an exploded view of the various components thereof. The track release mechanism 40 includes a base 44 configured with two substantially parallel arms or extensions 46. The base 44 can be made of a metal such as steel or aluminum or can be made of a composite material of suitable strength.

The base 44 supports the other components of the track release mechanism 40 and is used to couple the track release mechanism 40 to the vehicle seat 10 (e.g., the base 44 of the track release mechanism 40 is coupled to the upper track 18, which in turn is coupled to the seat cushion 11 by way of seat support members 12, 15, and 17). The base 44 can be coupled to the vehicle seat 10 by any convenient method such as welding, adhesives, or fasteners.

According to an exemplary embodiment, the arms 46 of the base 44 each define a bore 48 (e.g., an aperture, hole, opening, etc.). The bores 48 are coaxial with each other, and a center shaft 50 is configured to extend through each bore 48. The drive shaft 50 can be made of a metal such as steel or aluminum.

As shown in FIG. 7A, a drive module 52 is mounted on the center shaft 50 between the arms 46 of the base 44. The drive module 52 includes a drive arm 58 configured to support a locking block 60 and a biasing member 62 (e.g., a compression spring, a leaf spring, or the like). The drive arm 58 is positioned between a cable shell 54 having a cable notch 56 and an outer cable shell 64 having a guide pin 66.

According to an exemplary embodiment shown in FIG. 7A, the locking block 60 is aligned radially to the center shaft 50. According to another exemplary embodiment shown in FIG. 7B; the locking block 60 is aligned at an angle other than 90° to the center shaft 50 (e.g., the locking block 60 may be pivotably connected to a base 63 and a biasing member 62 such as a spring may be provided to bias the locking block 60 away from the base 63).

The center shaft 50 also supports a reset spring 68 mounted on the center shaft 50 and coupled to the cable shell 54. A trigger arm 70 is mounted on the center shaft 50 and defines a guide slot 72 which is configured to receive the guide pin 66 of the outer cable 64. The trigger arm 70 is biased on the center shaft 50 by a trigger spring 74. The reset spring 68 and the trigger spring 74 can be torsion springs as illustrated in the figures any other type of suitable biasing member.

A tab or extension 22 (also referred to as a profile or protrusion) is provided on the lower track 20, as shown in FIG. 2. According to an exemplary embodiment, the tab 22 is configured to engage the trigger arm 70 when the seat is moved along the track, as will be described in greater detail below. It should be noted that the size, shape, and configuration of the tab 22 may differ according to other exemplary embodiments from that shown in the accompanying FIGURES.

The operation of the track release mechanism will be described with respect to FIGS. 11A through 11G. For simplicity, the rotation of the arms will be described as "clockwise" or "counterclockwise" as those directions are shown in FIGS. 11A through 11G.

FIG. 11A illustrates the track release mechanism 40 in a locked position. In this position, seat back 13 is in the upright position and the track latch 30 operates to lock the seat 10 in place such that the extensions 34 of the operating member 32 engage apertures in the track (as shown, for example, in FIG. 2).

When the seat back 13 is folded down toward the seat cushion 11, the pin 19 coupled to the seat support member 15 contacts the drive arm 58, which rotates counterclockwise about the center shaft 50 (as shown in FIG. 11B). A corresponding rotation of the trigger arm 70 also results, such that the trigger arm 70 is oriented generally perpendicular or normal to the track (i.e., the trigger arm 70 is oriented in a generally vertical position). Additionally, the cable 42 is moved during the rotation to cause the track latch 30 to disengage the track (i.e., the extensions 34 of the operating member 32 disengage the apertures in the track to allow the seat to move freely along the track).

After folding the seat back 13 downward, the seat 10 is moved forward along the track as shown in FIG. 11C. When the vehicle seat 10 moves forward along the track system 16, the trigger arm 70 contacts the tab 22 that is coupled to the lower track 20. The trigger arm 70 moves in a counter-clockwise direction as the trigger arm 70 moves over the tab 22. The movement of the trigger arm 70 at this time is a free (uninhibited) swing (the pin 66 moves within the slot 72 as the trigger arm 70 is rotated counterclockwise). After the trigger arm 70 moves past the tab 22 as shown in FIG. 11D, the trigger arm 70 swings back to its vertical orientation prior to its engagement with the tab 22.

When the vehicle seat 10 slides back along the track from the forward position, the trigger arm 70 contacts the tab 22 once more as shown in FIG. 11E. The outer shell 64 is forced to rotate in a clockwise direction, which causes the locking block 60 to pull out of engagement with the cable shell 54. That motion causes the track cable 42 to move the track latch 30 to cause the operating member 32 to lock the vehicle seat 10 in the seat track system 16. That is, when the trigger arm 70 engages the tab 22 when it is moved back along the track, the track release mechanism is reset, along with the track latch 30. As a result, the extensions 34 of the spring-loaded track latch 30 will engage the first set of openings in the lower track 20 they reach to lock the seat in place.

In essence, such a configuration allows one-handed locking of a folded seat along a track. For example, the user may move the seat forward such that the trigger arm 70 moves past the tab 22, after which the seat may be locked in place simply by moving the seat backward along the track until the trigger arm once more engages the tab 22 (and without the need to manually reset the track release mechanism 40 with a lever or the like).

As shown in FIG. 11F, however, the track release mechanism 40 does not automatically reset itself once the trigger arm moves past the tab 22. After moving past the tab 22, the trigger arm 70 swings freely back toward the vertical position. However, the drive arm 58 is held by the pin 19 since the seat back 13 is still folded at this time. The track release mechanism 40 thus cannot reset until the pin 19 is released (moved off of the drive arm 58 when the seat back 13 is moved from the folded or stowed position to the upright seating position). However, the vehicle seat 10 can still be moved along the vehicle track system 16 by unlocking the vehicle track system 16 by operation of a remote handle 80 coupled to a release cable 82 which is coupled to the track latch 30.

As shown in FIG. 11G, when the pin 19 is moved off of the drive arm 58, the track release mechanism 40 is reset to its original position. The reset spring 68 rotates the drive arm 58, outer shell 654, and trigger arm 70 back to their original position (as shown in FIG. 11A). The locking block 60 is returned to the locked position by the biasing member 62, and the track release mechanism 40 is ready for the next cycle.

As described above, according to an exemplary embodiment, there is provided a track release mechanism for a vehicle seat. The vehicle seat is coupled to a track system having a lower track secured to a vehicle, an upper track slidingly attached to the lower track, and a track latch configured to lock the seat with an operating member in a preselected position along the lower track. The track release mechanism includes a base configured with two substantial parallel arms, with each arm defining a bore with the bores coaxial. A center shaft is configured to engage in each bore. A drive arm module is mounted on a center shaft between the arms of the base. The drive module includes the drive arm configured to support a locking block and a biasing member. The drive arm is positioned between a cable shell having a cable notch and an outer cable shell having a guide pin. A reset spring is Mounted on the center shaft and coupled to the cable shell. A trigger arm is mounted on the center shaft in defining a guide slot configured to receive the guide pin. The trigger arm is biased on the center shaft by a trigger spring. A tab is coupled to the lower track and configured to move the trigger arm. A cable is coupled to the drive arm module and the track latch. The movement of the vehicle seat along the track system causes the track release mechanism to reset as a trigger arm being moved by the tab. Another embodiment of the track release mechanism includes a remote handle and release cable coupled to the track latch; wherein the remote handle is operated unlocking the track latch.

There is also provided a method for automatic reset of a track release module coupled to a vehicle seat mounted in a vehicle on a track system. The vehicle seat includes a track latch and a seat support member having a mechanical arm (e.g., a pin coupled to a seat support member). The method comprises the steps of providing a cable of predetermined length and coupling one end of the cable to the track release module. Another end of the cable is coupled to the track latch, and the track release module moves from a tripped position to a reset position as the seat is moved from a forward position to a rear position along the track system. Another embodiment of the method includes the step of providing a remote handle and release cable coupled to the track latch, wherein the remote handle and release cable releases the track latch when the track release module is still in the tripped position.

The foregoing description and accompanying drawings relate to seats or chairs particularly adapted for use in motor vehicles such as cars, SUV's, vans, trucks, busses and the like. It will be appreciated by those reviewing this disclosure, however, that the various exemplary embodiments described herein may also be applicable to seating used in aircrafts, railroad vehicles, nautical vehicles, and in other environments. Such seats may be configured as split seats or a bench-type seats, and may have any of a wide variety of configurations.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the vehicle seats and track release mechanisms as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Additionally, while certain mechanical systems are described to move seat components to achieve certain results, other mechanisms (either manual or powered) could be substituted therefor (e.g., various mechanical equivalents may be substituted for the seat contours, including, but not limited to, fore-bar linkages, air or hydraulic cylinders, air bladders, rack and pinion systems, cans and cables, gears, etc.). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A track release system for a vehicle seat having a seat member configured to move between a first position and a second position; the track release system comprising:
   a device for selectively engaging a track to prevent sliding movement of a vehicle seat;
   a cable coupled to the device; and
   a track release mechanism coupled to the cable for actuating the device, the track release mechanism comprising:
      a drive arm configured to move between a first position and a second position through direct contact with a pin attached to the seat member, the drive arm configured to cause the device to disengage the track when moved from the first position to the second position; and
      a trigger arm configured for rotational movement and configured to cause the device to engage the track when the drive arm is in the second position;
   whereby the trigger arm is configured to reset the track release system such that sliding movement of the vehicle seat is prevented when the drive arm is in the second position and the pin is moved out of contact with the drive arm.

2. The track release system of claim 1, wherein the drive arm is configured to move between the first position and the second position when the seat member of the vehicle seat is folded to a stowed position.

3. The track release system of claim 2, wherein the track release mechanism is configured to prevent movement of the folded vehicle seat without the need to manually reset the track release system.

4. The track release system of claim 1, wherein the trigger arm is configured for movement between a first location and a second location along the track, the trigger arm contacting a feature provided on the track when moving between the first location and the second location.

5. The track release system of claim 4, wherein the trigger arm does not cause the device to engage the track when the trigger arm is moved from the first location to the second location.

6. The track release system of claim 5, wherein the trigger arm causes the device to engage the track when the trigger arm is moved from the second location to the first location.

7. The track release system of claim 6, wherein the trigger arm is configured to contact a feature provided on the track when moved from the second location to the first location to cause the device to engage the track.

8. The track release system of claim 6, wherein the drive arm is configured to move from the first position to the second position when a portion of the vehicle seat is folded to a stowed position.

9. The track release system of claim 8, wherein the track release system is configured to allow sliding movement of the vehicle seat along the track when the drive arm is in the second position until the trigger arm is moved from the second location to the first location.

10. A track release system for a vehicle seat comprising:
   a device for selectively engaging a track to prevent sliding movement of a vehicle seat;
   a cable coupled to the device; and
   a track release mechanism coupled to the cable for actuating the device, the track release mechanism comprising:
      a drive arm configured for movement between a first position and a second position, the drive arm configured to cause the device to disengage the track when moved from the first position to the second position; and
      a trigger arm configured for rotational movement and configured to cause the device to engage the track when the drive arm is in the second position;
   whereby the trigger arm is configured to reset the track release system such that sliding movement of the vehicle seat is prevented when the drive arm is in the second position;

wherein the track release mechanism further comprises a base comprising two substantially parallel arms and a shaft extending between the arms of the base.

11. The track release system of claim 10, wherein the drive arm and the trigger arm are provided on the shaft between the arms of the base.

12. The track release system of claim 11, wherein the track release mechanism comprises a cable shell having a cable notch and an outer shell having a guide pin.

13. The track release system of claim 12, wherein the drive arm is positioned between the cable shell and the outer shell.

14. The track release system of claim 12, wherein the drive arm supports a locking block and a biasing member for the locking block, the locking block configured for selective engagement with the cable shell.

15. The track release system of claim 14, wherein the locking block is configured for movement radially with respect to the center shaft.

16. The track release system of claim 14, wherein the locking block is configured for movement at an angle other than ninety degrees with respect to the center shaft.

17. The track release system of claim 14, wherein the trigger arm defines a guide slot configured to receive the guide pin, with the trigger arm biased on the center shaft by a trigger spring.

18. The track release system of claim 14, wherein the trigger arm is configured to contact a feature provided on the track when the trigger arm is moved past the feature along the track both in a first direction and in a second direction.

19. The track release system of claim 18, wherein the trigger arm is configured to cause the device to engage the track when the trigger arm contacts the feature while moving in the second direction but not while moving in the first direction.

20. The track release system of claim 19, wherein moving the trigger arm in the first direction corresponds to moving the vehicle seat toward the front of a vehicle and moving the trigger arm in the second direction corresponds to moving the vehicle seat toward the rear of the vehicle.

21. The track release system of claim 19, wherein the outer shell is configured to rotate to cause the locking block to disengage the cable shell when the trigger arm contacts the feature while moving in the second direction.

22. The track release system of claim 21, wherein the outer shell is configured such that rotation of the outer shell causes the cable to move the device to engage the track to prevent sliding movement of the vehicle seat.

23. The track release system of claim 22, wherein the track release mechanism further comprises a reset spring mounted on the center shaft and coupled to the cable shell.

24. The track release system of claim 23, wherein the drive arm is configured for movement from the first position to the second position when a seat back of the vehicle seat is folded to a stowed position and the reset spring is configured to return the drive arm to the first position when the seat back is returned to an upright position.

* * * * *